(12) United States Patent
Idzerda et al.

(10) Patent No.: US 12,515,415 B2
(45) Date of Patent: Jan. 6, 2026

(54) PRODUCTION LINE FOR PFCS WITH FMDS

(71) Applicant: TPG Plastics LLC, Oakbrook Terrace, IL (US)

(72) Inventors: Peter Lloyd Idzerda, Alton (CA); Thomas Edward Cameron, Mississauga (CA); Daniel Cornelis Idzerda, Grand Valley (CA)

(73) Assignee: Greif US Plastics LLC, Delaware, OH (US)

( * ) Notice: Subject to any disclaimer, the term of this patent is extended or adjusted under 35 U.S.C. 154(b) by 144 days.

(21) Appl. No.: 18/099,726

(22) Filed: Jan. 20, 2023

(65) Prior Publication Data
US 2024/0246303 A1 Jul. 25, 2024

(51) Int. Cl.
B29C 65/00 (2006.01)
B29C 65/24 (2006.01)
B29C 65/78 (2006.01)
B29L 31/00 (2006.01)

(52) U.S. Cl.
CPC ............ *B29C 66/872* (2013.01); *B29C 66/53* (2013.01); *B29C 66/814* (2013.01); *B29C 66/97* (2013.01); *B29C 65/242* (2013.01); *B29C 65/7838* (2013.01); *B29C 65/7844* (2013.01); *B29C 66/52294* (2013.01); *B29C 66/53242* (2013.01); *B29C 66/53246* (2013.01); *B29C 66/5344* (2013.01); *B29C 66/63* (2013.01); *B29C 66/634* (2013.01); *B29L 2031/7172* (2013.01)

(58) Field of Classification Search
CPC .............. B29C 65/242; B29C 65/7838; B29C 65/7844; B29C 66/5521; B29C 66/52272; B29C 66/52294; B29C 66/53242; B29C 66/53246; B29C 66/5344; B29C 66/63; B29C 66/634
See application file for complete search history.

(56) References Cited

U.S. PATENT DOCUMENTS

| 10,960,245 | B2 | 3/2021 | Tarahomi et al. | |
| 11,931,611 | B2* | 3/2024 | Cray | B65D 25/385 |
| 2017/0266474 | A1* | 9/2017 | Elias | A62C 4/00 |

* cited by examiner

Primary Examiner — Philip C Tucker
Assistant Examiner — Nickolas R Harm
(74) Attorney, Agent, or Firm — Erik J. Overberger; RANKIN, HILL & CLARK LLP

(57) ABSTRACT

A production line for PFCs with FMDs includes a conveyor system, a supply system, and an installation system. The conveyor system is operable to convey PFCs. The supply system includes a roller stage. The roller stage operable to feed FMDs. The installation system includes an installation tool. The installation tool includes a mandrel, a platen, a platen heater, and a platen actuator. The installation tool is configured to receive FMDs from the roller stage in part around the mandrel and in part around the platen, configured to insert into PFCs on the conveyor system, and operable to install FMDs thereto by the operation of the platen heater to heat the platen and the platen actuator to radially expand the platen.

15 Claims, 8 Drawing Sheets

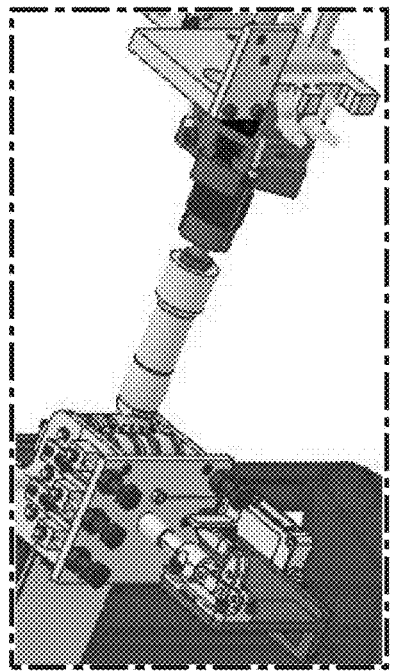 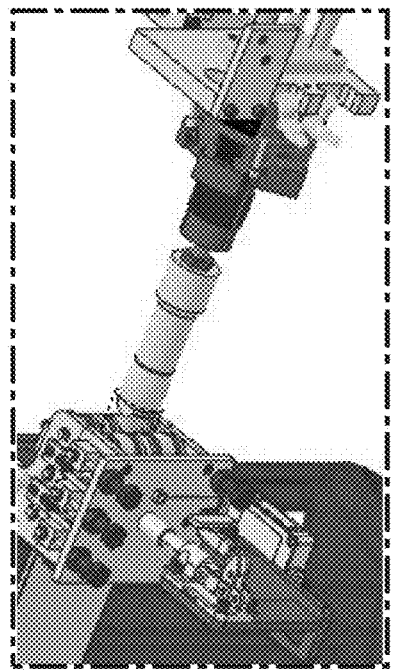 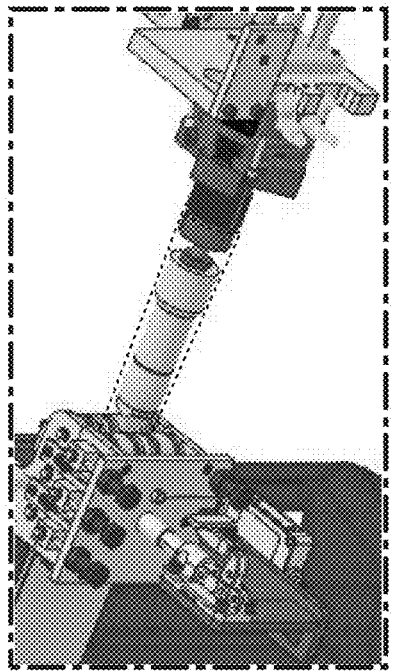
FIG. 6A  FIG. 6B  FIG. 6C
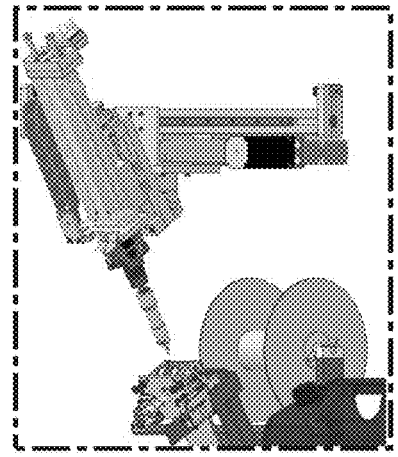 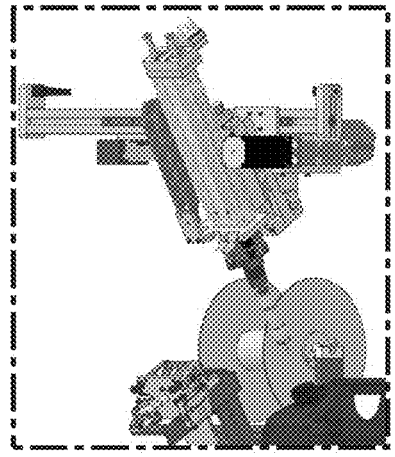 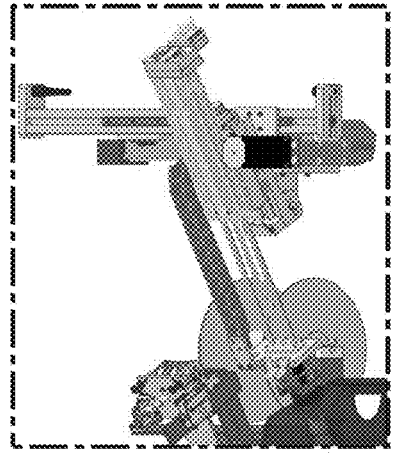
FIG. 7A  FIG. 7B  FIG. 7C

PRODUCTION LINE FOR PFCS WITH FMDS

TECHNICAL FIELD

The embodiments disclosed herein relate to the production of portable fuel containers (PFCs) and, more particularly, to PFCs whose production includes the installation of flame mitigation devices (FMDs).

BACKGROUND

Standard consumer-grade handheld PFCs include fuel reservoirs and access ports therefor. Some PFCs also include FMDs for preventing air-fuel mixtures ignited as flames about the access ports from igniting air-fuel mixtures in the fuel reservoirs. Using FMDs, PFCs are configured to prevent air-fuel mixtures ignited as flames about their access ports from igniting air-fuel mixtures in their fuel reservoirs.

SUMMARY

Disclosed herein are embodiments of a production line for PFCs with FMDs.

In one aspect, a production line for PFCs with FMDs includes a conveyor system, a supply system, and an installation system. The conveyor system is operable to convey PFCs. The supply system includes a roller stage. The roller stage operable to feed FMDs. The installation system includes an installation tool. The installation tool includes a mandrel, a platen, a platen heater, and a platen actuator. The installation tool is configured to receive FMDs from the roller stage in part around the mandrel and in part around the platen, configured to insert into PFCs on the conveyor system, and operable to install FMDs thereto by the operation of the platen heater to heat the platen and the platen actuator to radially expand the platen.

In another aspect, a production line for PFCs with FMDs includes a storage reel, a roller stage, a cutting tool, a closing tool, and a control module. The storage reel is configured to store sleeving. The roller stage is operable to feed a leading length of the sleeving. The cutting tool is operable to cut the sleeving. The closing tool is operable to permanently pinch the sleeving closed. The control module is configured to operate the cutting tool, the closing tool, and the roller stage to alternately perform formation cycles and feeding cycles on the sleeving. The formation cycles include the operation of the cutting tool to cut the sleeving and the operation of the closing tool to permanently pinch the sleeving closed. The feeding cycles include the operation of the roller stage to feed FMDs with open mouths formed by the cutting tool and closed bottoms formed by the closing tool.

In yet another aspect, a production line for PFCs with FMDs includes a conveyor system, a supply system, an installation system, a test system upstream of the installation system, and a check system downstream of the installation system. The conveyor system is operable to convey PFCs. The supply system is operable to make FMDs. The installation system includes an installation tool. The installation tool includes a mandrel, a platen, a platen heater, and a platen actuator. The installation tool is configured to receive FMDs from the supply system in part around the mandrel and in part around the platen, configured to insert into PFCs on the conveyor system, and operable to install FMDs thereto by the operation of the platen heater to heat the platen and the platen actuator to radially expand the platen. The test system is operable to conduct leakproofness tests on PFCs on the conveyor system. The check system is operable to conduct FMD checks on PFCs on the conveyor system.

These and other aspects will be described in additional detail below.

BRIEF DESCRIPTION OF THE DRAWINGS

The various features, advantages and other uses of the present embodiments will become more apparent by referring to the following detailed description and drawing in which:

FIGS. 6A-6C are partial perspectives views of the supply system and the installation system, showing aspects of the supply system supplying FMDs to the installation system and installation receiving FMDs from the supply system;

FIGS. 7A-7C are partial perspective views of the installation system, showing aspects of installing FMDs to PFCs on the conveyor system.

DETAILED DESCRIPTION

This disclosure teaches a production line for PFCs with FMDs. The production line advantageously operates as a self-contained module that inputs PFCs without FMDs, stores FMD material and supplies FMDs, and outputs leakproofness-tested and FMD-checked PFCs with FMDs.

In this disclosure, it will be understood that "PFC(s)" means "portable fuel container(s)" and that "FMD(s)" means "flame mitigation device(s)." In general, PFCs with FMDs are PFCs whose production includes the installation of FMDs. Accordingly, depending on the installation of FMDs, it will be understood that uses of "PFC(s)" may refer to PFC(s) without FMD(s) or PFC(s) with FMD(s). Likewise, it will be understood that uses of "FMD(s)" may refer to FMD(s) for PFC(s) or FMD(s) of PFC(s). With respect to PFC(s) and FMD(s), this disclosure is applicable to the portable fuel container and the flame mitigation device taught by the disclosure of commonly assigned U.S. application Ser. No. 16/280,478 filed on Feb. 20, 2019 (now U.S. Pat. No. 10,960,245 issued on Mar. 30, 2021), titled "FLAME MITIGATION DEVICE FOR A PORTABLE FUEL CONTAINER," which is herein incorporated by reference in its entirety.

Figure 1A:
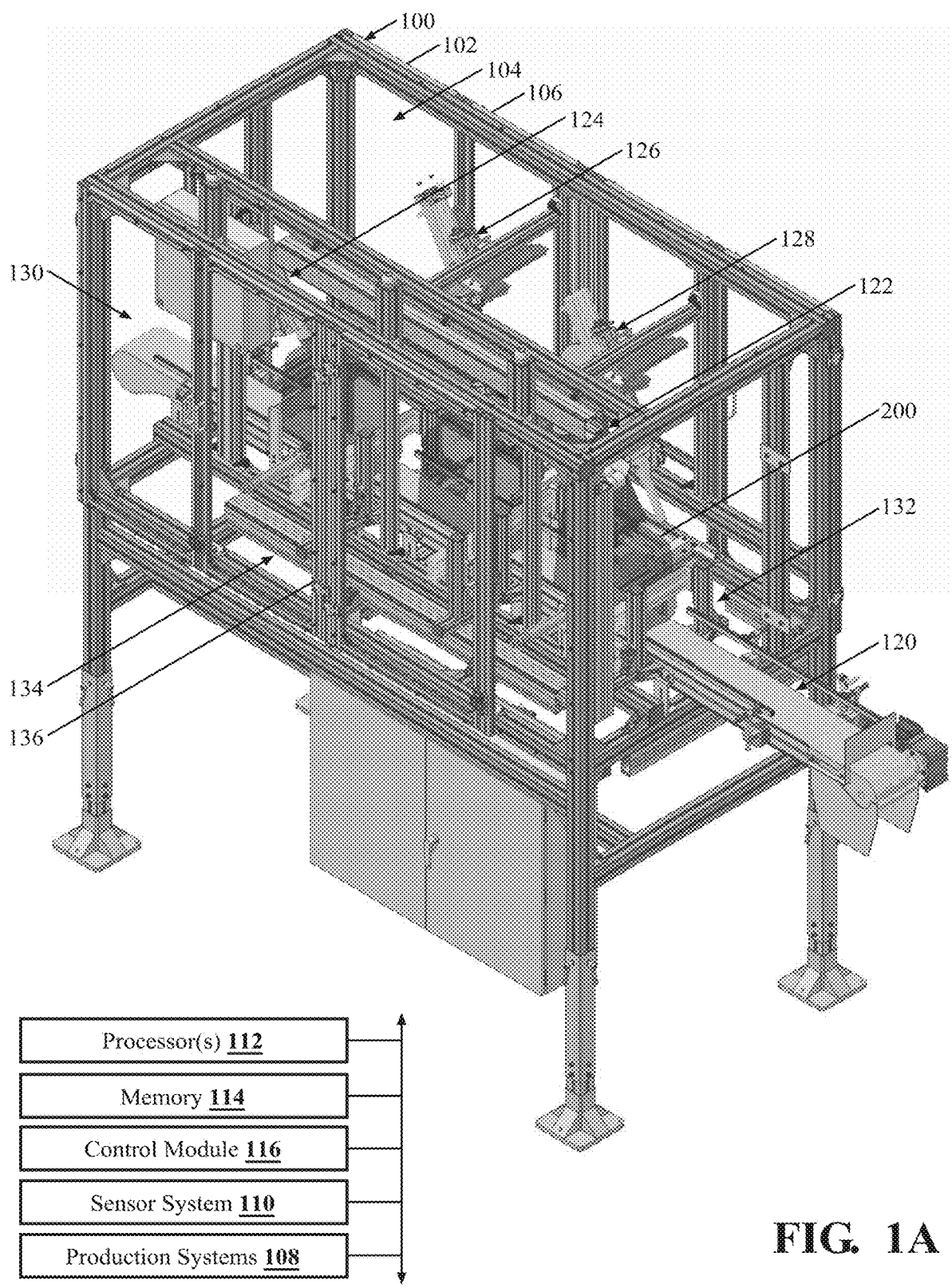
FIG. 1A is a perspective view of a production line for PFCs with FMDs, showing a frame and production systems by which the production line automates the installation of FMDs.
Figure 1B:
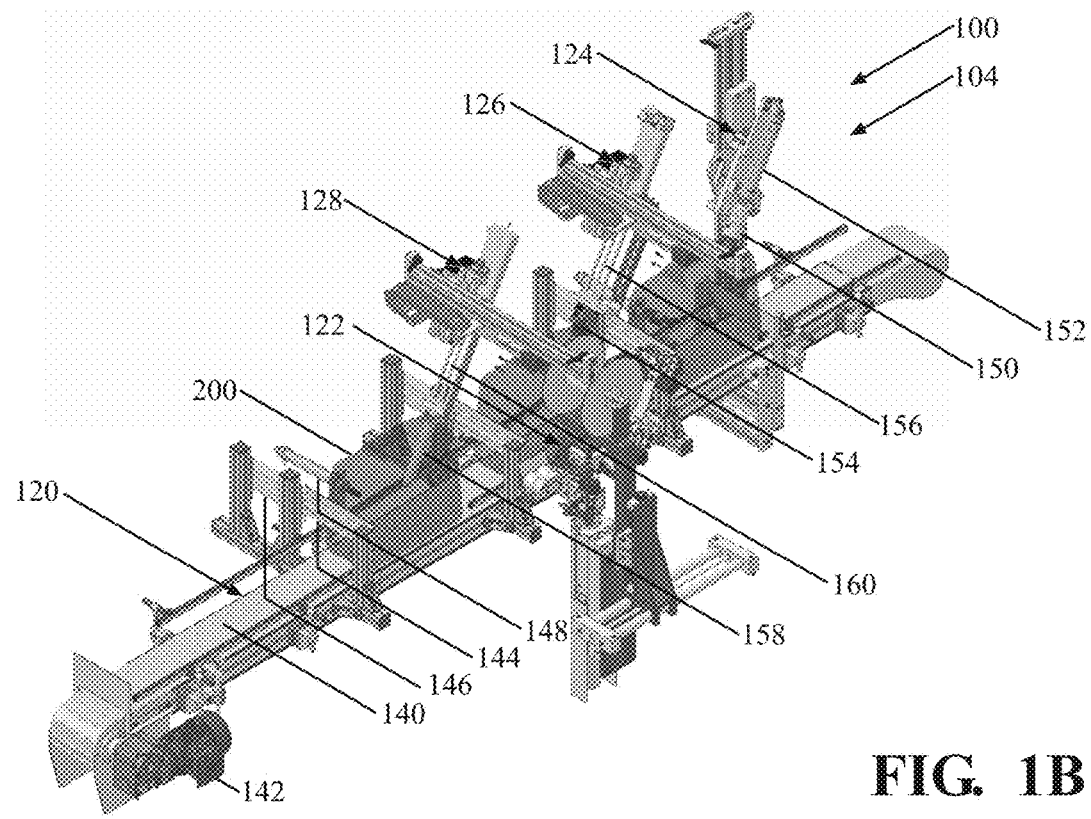
FIGS. 1B and 1C are perspective views of the production line with the frame party removed for better viewing of the production systems, showing a conveyor system, a supply system, a test system, an installation system, and a check system.
Figure 1C:
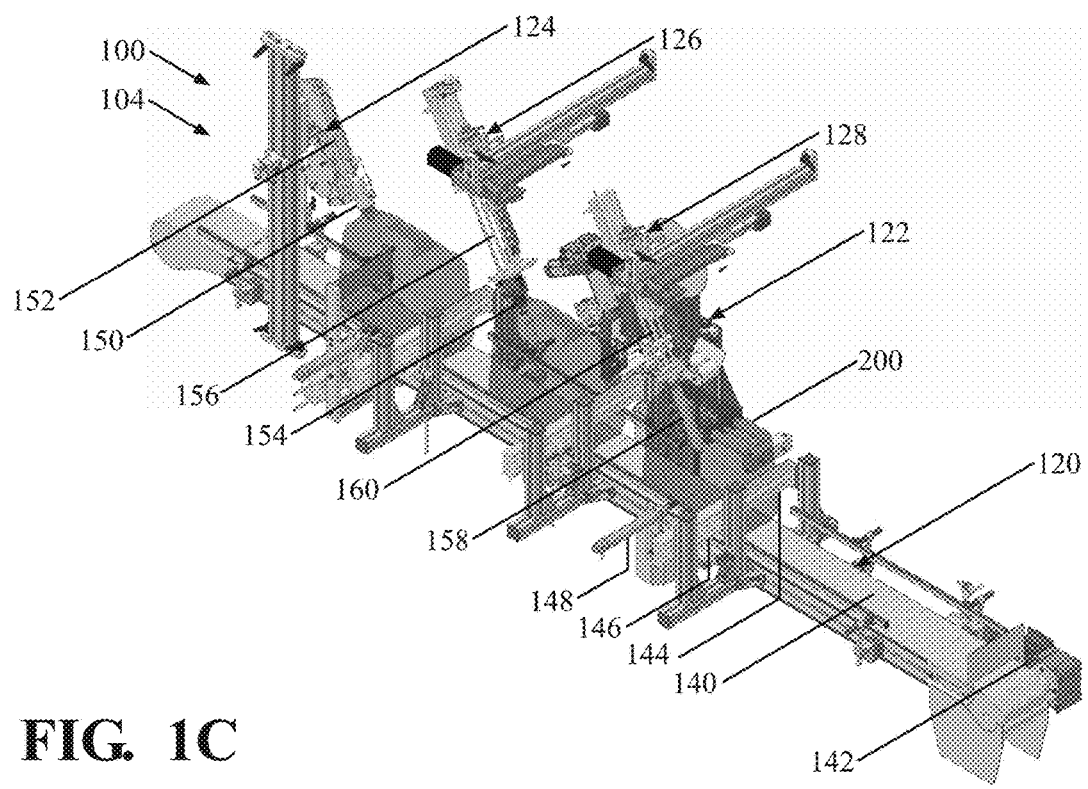

A production line 100 for PFCs 200 with FMDs 202 is shown in FIGS. 1A-1C. The description of the production line 100 follows with reference to the PFC 200 and the FMD 202 shown in FIGS. 2A-2C and described in additional detail below. As shown, the production line 100 has an exterior 102 and an interior production area 104. Moreover, the production line 100 includes a floor-mountable frame 106 and frame-mounted production systems 108. The frame 106 forms the exterior 102 and defines the production area 104. The production systems 108 are mounted to the frame 106 inside the production area 104. From inside the production area 104, the production systems 108 are operable to perform production functions by which the production line 100 automates the production of PFCs 200. More specifically, the production systems 108 are operable to perform production functions by which the production line 100 automates the installation of FMDs 202.

In addition to the production systems 108, the production line 100 includes a sensor system 110, as well as one or more processors 112, memory 114, and a control module 116 to which the production systems 108 and the sensor system 110 are communicatively connected. The sensor system 110 is operable to detect information about the production line 100. The processors 112, the memory 114, and the control module 116 together serve as a computing device whose control module 116 is configured to coordinate the operation of the production line 100. More specifically, the control module 116 operates the production systems 108 based on information about the production line 100. Accordingly, as a prerequisite to operating the production systems 108, the control module 116 gathers information about the production line 100, including information about the production line 100 detected by the sensor system 110. The control module 116 then evaluates the information about the production line 100, and operates the production systems 108 based on its evaluation.

As shown, the production systems 108 include a mainline conveyor system 120 and a line-side supply system 122. The conveyor system 120 is mounted to the frame 106 through the production area 104. The supply system 122 is mounted to the frame 106 beside the conveyor system 120. In addition to the conveyor system 120 and the supply system 122, the production systems 108 include a line-facing test system 124, a line-facing installation system 126, and a line-facing check system 128. The test system 124, the installation system 126, and the check system 128 are spaced apart from one another along the conveyor system 120. Moreover, the supply system 122 and the installation system 126 are co-located with one another along the conveyor system 120. The test system 124 is mounted to the frame 106 facing the conveyor system 120 upstream of the installation system 126. The installation system 126 is mounted to the frame 106 facing the conveyor system 120 and the supply system 122. The check system 128 is mounted to the frame 106 facing the conveyor system 120 downstream of the installation system 126.

The conveyor system 120 is operable to convey PFCs 200 into the production area 104, through the production area 104, and out of the production area 104. As part of conveying PFCs 200 through the production area 104, the conveyor system 120 is operable to convey PFCs 200 to the test system 124, to the installation system 126, and to the check system 128. Moreover, as part of conveying PFCs 200 to the test system 124, to the installation system 126, and to the check system 128, the conveyor system 120 is operable to stop PFCs 200 at the test system 124, at the installation system 126, and at the check system 128. In addition, alternatively to conveying PFCs 200 from the test system 124, the conveyor system 120 is operable to reject PFCs 200 at the test system 124 from the conveyor system 120. Similarly, alternatively to conveying PFCs 200 from the check system 128, the conveyor system 120 is operable to reject PFCs 200 at the check system 128 from the conveyor system 120.

The supply system 122 is operable to make FMDs 202 and supply FMDs 202. More specifically, the supply system 122 is operable to supply FMDs 202 to the installation system 126. Likewise, the installation system 126 is operable to receive FMDs 202 from the supply system 122. From upstream of the installation system 126, the test system 124 is operable to conduct leakproofness tests on PFCs 200 on the conveyor system 120. In connection with receiving FMDs 202 from the supply system 122, the installation system 126 is operable to install FMDs 202 to PFCs 200 on the conveyor system 120. From downstream of the installation system 126, the check system 128 is operable to conduct FMD checks on PFCs 200 on the conveyor system 120. Either alone or in conjunction with making FMDs 202 and supplying FMDs 202, the throughput of the production line 100 may be limited by the time associated with installing FMDs 202 to PFCs 200. Accordingly, although the production line 100, as shown, includes one supply system 122 and one installation system 126, it will be understood that this disclosure is applicable in principle to otherwise similar production lines 100 that include multiple supply systems 122, multiple installation systems 126, or both.

The production line 100 advantageously operates as a self-contained module that inputs PFCs 200 without FMDs 202 and outputs leakproofness-tested and FMD-checked PFCs 200 with FMDs 202. More specifically, in the operation of the production line 100, for each corresponding PFC 200 and FMD 202, the control module 116 operates the conveyor system 120 to convey the PFC 200 into the production area 104 and to the test system 124. After operating the conveyor system 120 to stop the PFC 200 at the test system 124, the control module 116 operates the test system 124 to conduct a leakproofness test on the PFC 200. The control module 116 operates the conveyor system 120 to convey the PFC 200 from the test system 124 conditionally upon the PFC 200 passing the leakproofness test. More specifically, based on information about the production line 100 detected by the sensor system 110, the control module 116 identifies whether the PFC 200 passed the leakproofness test. When it does not identify that the PFC 200 passed the leakproofness test, the control module 116 operates the conveyor system 120 to reject the PFC 200 from the conveyor system 120. Otherwise, when it identifies that the PFC 200 passed the leakproofness test, the control module 116 operates the conveyor system 120 to convey the PFC 200 from the test system 124 to the installation system 126.

In connection with the installation of the FMD 202 to the PFC 200, the control module 116 operates the supply system 122 to make the FMD 202. The control module 116 then operates the supply system 122 to supply the FMD 202 to the installation system 126 and operates the installation system 126 to receive the FMD 202 from the supply system 122. After operating the conveyor system 120 to stop the PFC 200 at the installation system 126, the control module 116 operates the installation system 126 to install the FMD 202 to the PFC 200. The control module 116 then operates the conveyor system 120 to convey the PFC 200 from the installation system 126 to the check system 128.

After operating the conveyor system 120 to stop the PFC 200 at the check system 128, the control module 116 operates the check system 128 to conduct an FMD check on the PFC 200. The control module 116 operates the conveyor system 120 to convey the PFC 200 from the check system 128 conditionally upon the PFC 200 passing the FMD check. More specifically, based on information about the production line 100 detected by the sensor system 110, the control module 116 identifies whether the PFC 200 passed the FMD check. When it does not identify that the PFC 200 passed the FMD check, the control module 116 operates the conveyor system 120 to reject the PFC 200 from the conveyor system 120. Otherwise, when it identifies that the PFC 200 passed the FMD check, the control module 116 operates the conveyor system 120 to convey the PFC 200 from the check system 128 and out of the production area 104.

In connection with automating the production of PFCs 200, the production line 100 may serve as a freestanding module for automating the installation of FMDs 202. Alternatively, the production line 100 may serve as an integrated module for automating the installation of FMDs 202 in a larger production line 100. With the production line 100 automating the installation of FMDs 202, the remainder of the larger production line 100 may otherwise automate the production of PFCs 200. For example, the remainder of the larger production line 100 may include an upstream blow-molding system operable to make PFCs 200. Relatedly, as an additional production system 108, the production line 100 may include an upstream transfer system operable to transfer PFCs 200 from the blow-molding system to the conveyor system 120. For example, the remainder of the larger production line 100 may include a downstream labeling system operable to label PFCs 200. Relatedly, as an additional production system 108, the production line 100 may include a downstream transfer system operable to transfer PFCs 200 from the conveyor system 120 to the labeling system.

As shown with particular reference to FIG. 1A, the frame 106 has a generally open construction. As part of its construction, the frame 106 defines one or more openings that open between the exterior 102 and the production area 104. As shown, normally to the conveyor system 120, the frame 106 defines an upstream input opening 130 and a downstream output opening 132. Relatedly, the conveyor system 120 is operable to convey PFCs 200 into the production area 104 through the input opening 130 and out of the production area 104 through the output opening 132. Moreover, along the conveyor system 120, the frame 106 defines access openings 134, and includes access panels 136 corresponding to the access openings 134. The access panels 136 serve as closure panels for the production area 104, and are connected to the remainder of the frame 106 for movement between closed positions and open positions. In the closed positions, the access panels 136 are positioned over the access openings 134. In the open positions, the access panels 136 are positioned away from the access openings 134, which allows access to the production area 104.

The frame 106 may be constructed from any combination of rigidly interconnected uprights, rails, crossmembers, and like frame members, as well as any combination of fasteners, welds, adhesives, and like connectors for rigidly interconnecting the frame members. In one implementation, the frame members may be T-slot frame members, and the connectors may be T-slot connectors. In this and other implementations, the frame members may have any combination of extruded, fabricated, bent, stamped, casted, molded, and like constructions, and may be made from any combination of one or more metallic materials and one or more polymeric materials. For example, the frame members may have extruded constructions, and may be made from one or more metals suitable for extrusion, such as aluminum.

As shown with particular reference to FIGS. 1B and 1C, the conveyor system 120 includes a slat-type conveyor bed 140 and a conveyor motor 142. As part of the conveyor system 120, the conveyor bed 140 is mounted to the frame 106 through the production area 104. As shown, the conveyor bed 140 extends through the production area 104 with an upward-facing horizontal orientation to support PFCs 200 from below. The conveyor bed 140 is supported for rotation. The conveyor motor 142 is connected to the conveyor bed 140. The conveyor motor 142 may be connected to the conveyor bed 140 through a belt, chain, gearing, or other transmission. The conveyor motor 142 is operable to power the rotation of the conveyor bed 140. By the operation of the conveyor motor 142 to power the rotation of the conveyor bed 140, the conveyor system 120 is operable to convey PFCs 200 to the test system 124, to the installation system 126, and to the check system 128. Although the conveyor system 120, as shown, has a straight layout, it will be understood that this disclosure is applicable in principle to otherwise similar production lines 100 that include conveyor systems 120 with serpentine or otherwise non-straight layouts.

As noted above, the conveyor system 120 is operable to stop PFCs 200 at the test system 124, at the installation system 126, and at the check system 128. More specifically, the conveyor system 120 includes stop gates 144 and stop actuators 146 immediately upstream of the test system 124, the installation system 126, and the check system 128. As identified for the stop gate 144 and the stop actuator 146 for the check system 128, each stop actuator 146 is mounted beside the conveyor system 120 between the conveyor system 120 and the stop gate 144. The stop actuators 146 are operable to extend the stop gates 144 across the conveyor system 120 to engage PFCs 200 at the test system 124, at the installation system 126, and at the check system 128 against upstream movement along the conveyor system 120. As noted above, the conveyor system 120 is operable to reject PFCs 200 at the test system 124 and PFCs 200 at the check system 128 from the conveyor system 120. More specifically, the conveyor system 120 includes rejection actuators 148 midstream of the test system 124 and the check system 128. As identified for the rejection actuator 148 for the check system 128, each rejection actuator 148 is mounted beside the conveyor system 120. The rejection actuators 148 are operable to extend across the conveyor system 120 to push PFCs 200 at the test system 124 and at the check system 128 off the conveyor system 120.

The test system 124 is mounted to the frame 106 overhead the conveyor system 120. The test system 124 includes a test tool 150 and a test arm 152. The test arm 152 is mounted to the frame 106. The test tool 150 is mounted to the test arm 152. As noted above, the test system 124 is operable to conduct leakproofness tests on PFCs 200 on the conveyor system 120. More specifically, as described in additional detail below, the test arm 152 is operable to engage the test tool 150 with PFCs 200 on the conveyor system 120. The test tool 150 is configured to make pneumatic connections with PFCs 200. Moreover, the test tool 150 is operable to add gas to PFCs 200. Relatedly, among information about the production line 100, the sensor system 110 is operable to detect gas pressure in PFCs 200, based on which the control module 116 identifies whether they passed the leakproofness tests.

The installation system 126 is mounted to the frame 106 overhead the conveyor system 120 and the supply system 122. The installation system 126 includes an installation tool 154 and an installation arm 156. The installation arm 156 is mounted to the frame 106. The installation tool 154 is mounted to the installation arm 156. As noted above, the installation system 126 is operable to receive FMDs 202 from the supply system 122. More specifically, as described in additional detail below, the installation arm 156 is operable to move the installation tool 154 over the supply system 122, and the installation tool 154 is configured to receive FMDs 202 from the supply system 122. As noted above, the installation system 126 is operable to install FMDs 202 to PFCs 200 on the conveyor system 120. More specifically, as described in additional detail below, together with FMDs 202, the installation arm 156 is operable to move the installation tool 154 over the conveyor system 120, and insert the installation tool 154 into PFCs 200. From inside PFCs 200, the installation tool 154 is operable to install FMDs 202 to them.

The check system 128 is mounted to the frame 106 overhead the conveyor system 120. The check system 128 includes a check tool 158 and a check arm 160. The check arm 160 is mounted to the frame 106. The check tool 158 is mounted to the check arm 160. As noted above, the check system 128 is operable to conduct FMD checks on PFCs 200 on the conveyor system 120. More specifically, as described in additional detail below, the check arm 160 is operable to insert the check tool 158 into PFCs 200 and inside FMDs 202. Relatedly, among information about the production line 100, the sensor system 110 is operable to detect FMDs 202 of PFCs 200 around the check tool 158, based on which the control module 116 identifies whether they passed the FMD checks.

As noted above, the production line 100 is described with reference to the PFC 200 and the FMD 202 shown in FIGS. 2A-2C. As shown, the PFC 200 includes, in relevant part, an internal fuel reservoir 204 and an access port 206 therefor, and an external adaptor neck 208 around the access port 206. The fuel reservoir 204 is configured to store liquid fuel, and house air-fuel mixtures associated therewith. The access port 206 is for dispensing liquid fuel from the fuel reservoir 204, and filling the fuel reservoir 204 with liquid fuel. The adaptor neck 208 is configured as an interface for mounting external accessories over the access port 206.

The FMD 202 is in the fuel reservoir 204 behind the access port 206. The FMD 202 is elongate, and, along its length, includes, in relevant part, an open mouth 210 sealed around the access port 206, a closed bottom 212 opposing the mouth 210, and an intermediate tubular sidewall 214. Moreover, the FMD 202, including along the sidewall 214, defines multiple quenching openings 216. Along the mouth 210, the FMD 202 is coaxially inside the adaptor neck 208. The FMD 202 is connected by the mouth 210 to the adaptor neck 208 as an included irremovable part of the PFC 200. The quenching openings 216 are configured to allow liquid fuel therethrough, but prevent air-fuel mixtures ignited as flames from propagating therethrough. Using the FMD 202, the PFC 200 is configured to prevent air-fuel mixtures ignited as flames about the access port 206 from igniting air-fuel mixtures in the fuel reservoir 204.

The PFC 200 has a blow-molded or otherwise unitary whole construction. Moreover, the PFC 200 is made from one or more high-strength, durable, chemically fuel-resistant, and non-emissive polymeric materials. For example, the PFC 200 may be made from one or more thermoplastics suitable for blow molding, such as high-density polyethylene (HDPE). The FMD 202 has a woven construction, in relation to which the FMD 202 includes inelastically resiliently flexible interwoven warps and wefts, interstitially defines the quenching openings 216 between the warps and the wefts, and has an elastically flexible configuration. The FMD 202 is made from one or more high-strength, durable, chemically fuel-resistant, and flame-resistant polymeric materials. For example, the FMD 202 may be made from one or more thermoplastics suitable for weaving, such as polyethylene terephthalate (PET) or polybutylene terephthalate (PBT).

Figure 3:
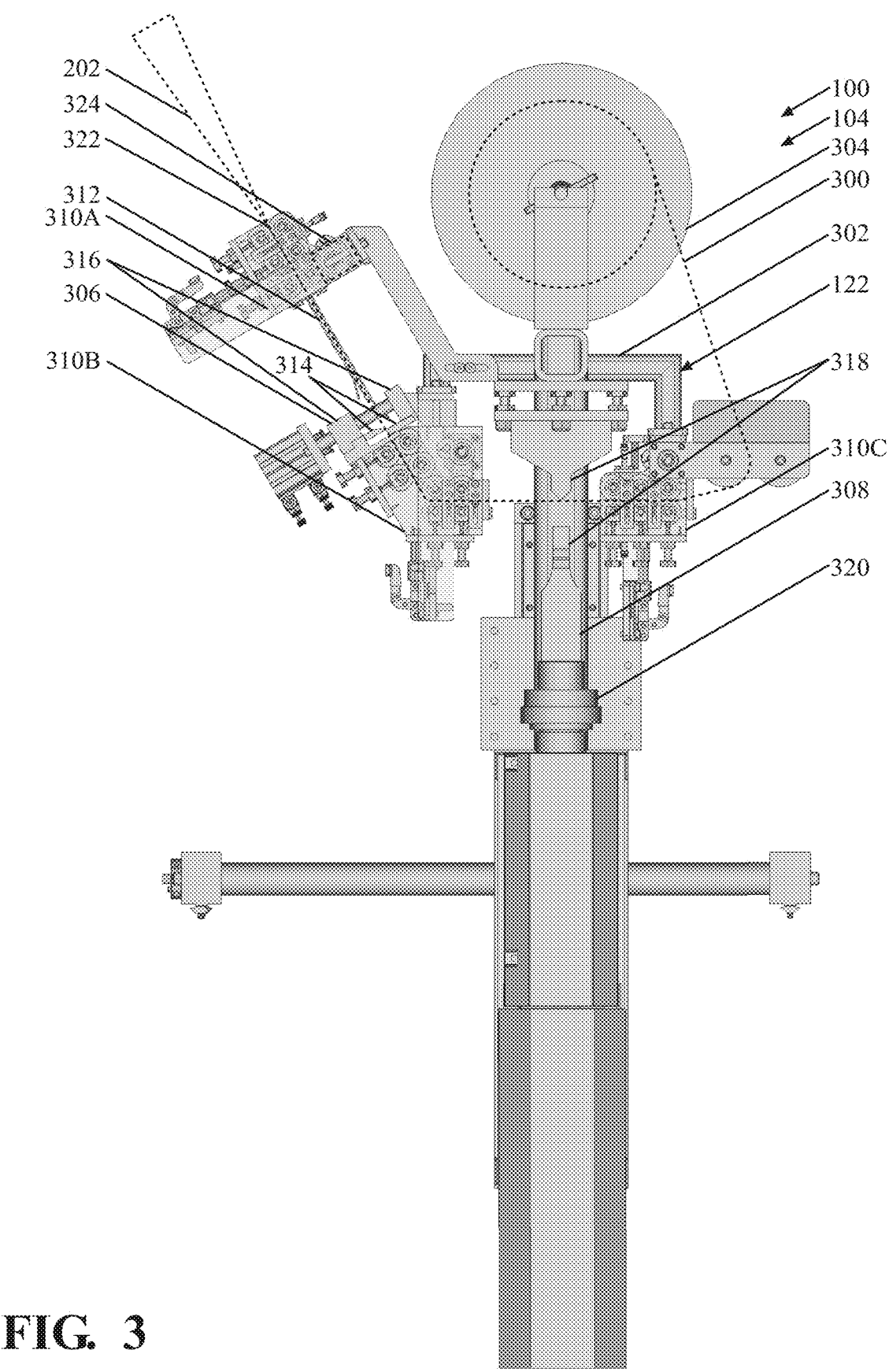
FIG. 3 is a side view of the supply system, showing aspects of making FMDs.

As shown with additional reference to FIG. 3, the supply system 122 is operable make FMDs 202 having woven constructions from a web of precursor woven tubular sleeving 300 in a cyclical process that culminates in supplying FMDs 202. As shown, the supply system 122 includes a mounting tree 302, a storage reel 304, a cutting tool 306, a closing tool 308, roller stages 310, and a transfer chute 312. The mounting tree 302 is mounted to the frame 106 beside the conveyor system 120. More specifically, the mounting tree 302 is slidably mounted to the frame 106 for movement along the conveyor system 120 to facilitate alignment between the supply system 122 and the installation system 126. The storage reel 304, the cutting tool 306, the closing tool 308, the roller stages 310, and the transfer chute 312 are mounted to the mounting tree 302. The storage reel 304 is configured to store the sleeving 300. As part of the supply system 122, the sleeving 300 is in part wound on the storage reel 304 for storage and in part unwound from the storage reel 304 for processing. The description of the supply system 122 follows with reference to the sleeving 300 unwound from the storage reel 304. Along its length, the sleeving 300 is routed through the cutting tool 306 and the closing tool 308. The cutting tool 306 is operable to cut the sleeving 300. The closing tool 308 is operable to permanently pinch the sleeving 300 closed. In addition, the sleeving 300 is routed through the roller stages 310 and the transfer chute 312. As shown, the roller stages 310 include a first roller stage 310A, a second roller stage 310B, and a third roller stage 310C. The first roller stage 310A and the second roller stage 310B flank the cutting tool 306. The transfer chute 312 is connected between the first roller stage 310A the cutting tool 306. The second roller stage 310B and the third roller stage 310C flank the closing tool 308. The roller stages 310 and the transfer chute 312 are configured to support the sleeving 300. With one, some, or all of the roller stages 310 being powered, the roller stages 310 are operable to feed the sleeving 300.

As noted above, the production line 100 advantageously operates as a self-contained module that inputs PFCs 200 without FMDs 202 and outputs leakproofness-tested and FMD-checked PFCs 200 with FMDs 202. As part of the production line 100, the supply system 122 advantageously operates as a self-contained module that stores FMD 202 material and supplies FMDs 202. More specifically, in the operation of the production line 100, the control module 116 operates the supply system 122 to alternately perform formation cycles and feeding cycles on the sleeving 300. In connection with the formation cycles and the feeding cycles, the supply system 122 has a length parameter corresponding to the overall lengths of FMDs 202. For example, the length parameter may be approximately 6 inches. The cutting tool 306 and the closing tool 308 are spaced apart from one another at a distance corresponding to the length parameter. During the formation cycles, the control module 116 operates the cutting tool 306 to cut the sleeving 300 and operates the closing tool 308 to permanently pinch the sleeving 300 closed. By the operation of the cutting tool 306 to cut the sleeving 300, the supply system 122 is operable to form the mouths 210 of FMDs 202. By the operation of the closing tool 308 to permanently pinch the sleeving 300 closed, the supply system 122 is operable to form the bottoms 212 of FMDs 202. During the feeding cycles, the control module 116 operates the roller stages 310 to feed lengths of the sleeving 300 corresponding to the length parameter. By the operation of the first roller stage 310A to feed the leading length of the sleeving 300, the supply system 122 is operable to supply FMDs 202.

The cutting tool 306 includes opposed blades 314 and a cutting press 316. The sleeving 300 is routed through the cutting tool 306 between the blades 314. The blades 314 are mounted to the cutting press 316. As noted above, during the formation cycles, the cutting tool 306 is operable to cut the sleeving 300. More specifically, the cutting press 316 is operable to close the blades 314 through the sleeving 300. During the feeding cycles, the cutting tool 306 is operable to disengage the sleeving 300. More specifically, the cutting press 316 is operable to open the blades 314 away from the sleeving 300. With the opening of the blades 314 away from the sleeving 300, the blades 314 are configured to disengage the sleeving 300.

The closing tool 308 includes an opposed closing set 318 and a closing press 320. The sleeving 300 is routed through the closing tool 308 between the closing set 318. The closing set 318 is mounted to the closing press 320. During the formation cycles, the closing tool 308 is operable to permanently pinch the sleeving 300 closed by fusing opposing circumferential halves of the sleeving 300 together into a seam. More specifically, the closing press 320 is operable to close the closing set 318 against the sleeving 300. With the closure of the closing set 318 against the sleeving 300, the closing set 318 is configured to radially pinch the sleeving 300. Moreover, the closing set 318 is operable to heat the resulting junction between opposing circumferential halves of the sleeving 300 to fuse them together into a seam upon cooling. For example, as shown, the closing set 318 is a sonic welding set. The closing set 318 includes an anvil and an ultrasonic horn. With the closure of the anvil and the ultrasonic horn against the sleeving 300, the ultrasonic horn is operable to sonic weld the resulting junction between opposing circumferential halves of the sleeving 300. During the feeding cycles, the closing tool 308 is operable to disengage the sleeving 300. More specifically, the closing press 320 is operable to open the closing set 318 away from the sleeving 300. With the opening of the closing set 318 away from the sleeving 300, the closing set 318 is configured to disengage the sleeving 300.

As identified for the first roller stage 310A, each roller stage 310 includes multiple nip-type twin-rollers 322 and a roller motor 324. The sleeving 300 is routed through the roller stage 310 between the twin-rollers 322. Correspondingly, the roller stage 310 supports the sleeving 300 between the twin-rollers 322. Moreover, the lines of centers of adjacent twin-rollers 322 mutually define the axial orientation of the roller stage 310 and the sleeving 300. The twin-rollers 322 are supported for tractive rotation against the sleeving 300. As shown, the twin-rollers 322 are spring-biased for engagement with the sleeving 300. Under the spring-bias for engagement with the sleeving 300, the twin-rollers 322 are configured to radially pinch the sleeving 300 and make tractive engagement with the resulting junction between opposing circumferential halves of the sleeving 300. The roller motor 324 is connected to one, some, or all of the twin-rollers 322. The roller motor 324 may be connected to the twin-rollers 322 through a belt, chain, gearing, or other transmission. For example, with the twin-rollers 322 supported for tractive rotation against the sleeving 300, the roller stage 310 may include a belt running between the roller motor 324 and one roller of each twin-roller 322. During the feeding cycles, the roller motor 324 is operable to power the tractive rotation of the twin-rollers 322 against the sleeving 300. By the operation of the roller motor 324 to power the tractive rotation of the twin-rollers 322 against the sleeving 300, the roller stage 310 is operable to feed the sleeving 300.

Figure 4:
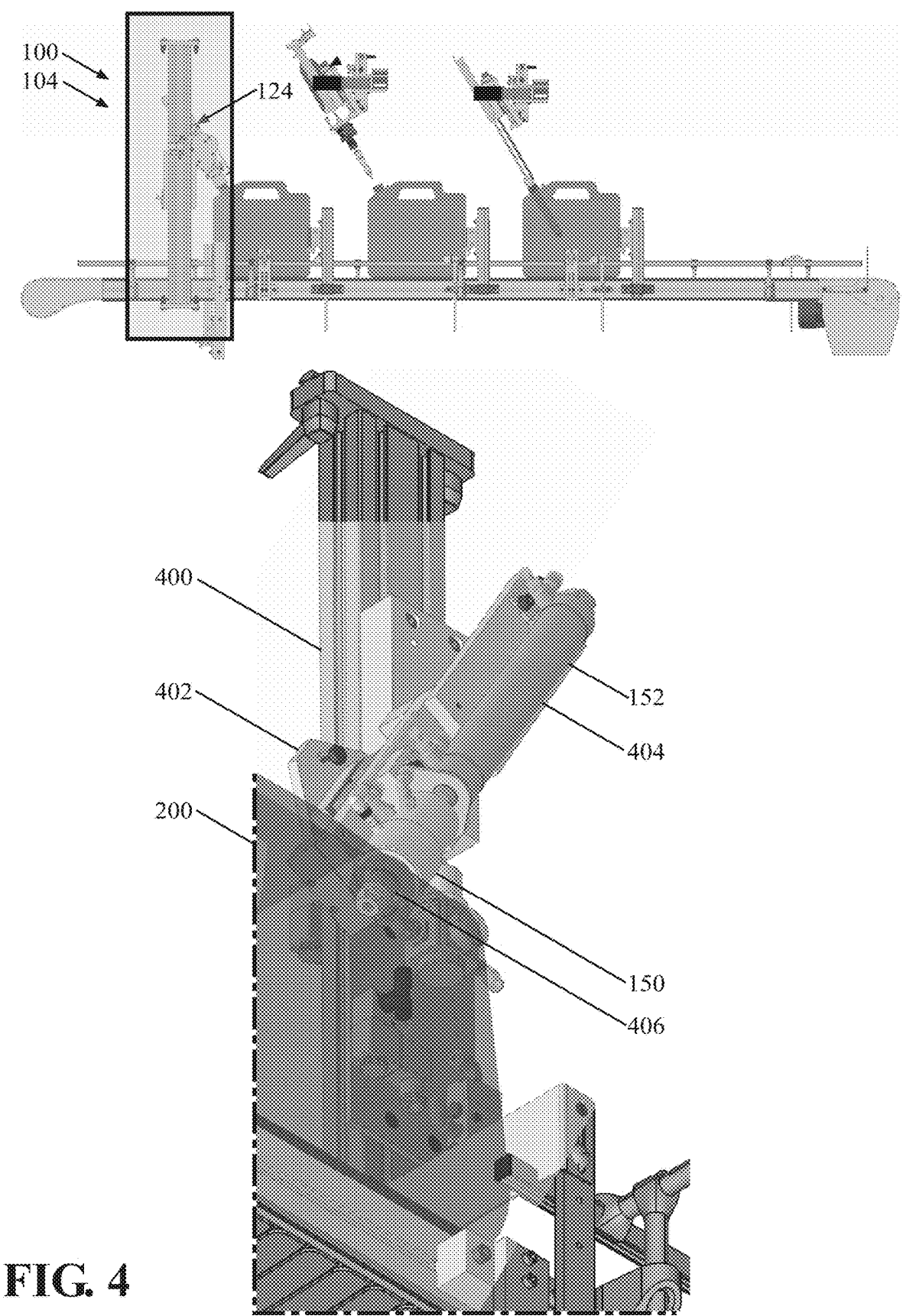
FIG. 4 is a partial perspective view of the test system, showing aspects of conducting leakproofness tests on PFCs on the conveyor system.

As shown with additional reference to FIG. 4, in the test system 124, the test arm 152 includes a test arm mast 400, a test arm pivot bracket 402, and a test tool actuator 404. The test arm mast 400 is mounted to the frame 106 upright from the conveyor system 120. The test arm pivot bracket 402 is mounted to the test arm mast 400. The test tool actuator 404 is mounted to the test arm pivot bracket 402. The test tool 150 is mounted to the test tool actuator 404. As part of the test arm 152, the test arm mast 400 and the test arm pivot bracket 402 support the test tool 150 from the frame 106. As supported by the test arm 152 using the test arm mast 400, the test tool 150 is positioned over the conveyor system 120. As supported by the test arm 152 using the test arm pivot bracket 402, the test tool 150 is parallelly oriented with PFCs 200 on the conveyor system 120. More specifically, the test tool 150 is parallelly oriented with the adaptor necks 208 of PFCs 200 on the conveyor system 120. From over the conveyor system 120, the test arm 152 supports the test tool 150 in axial alignment with PFCs 200 on the conveyor system 120, and, more specifically, the adaptor necks 208 of PFCs 200 on the conveyor system 120. In addition, by the operation of the test tool actuator 404, the test arm 152 is operable to axially advance the test tool 150 and axially withdraw the test tool 150.

As shown, the test tool 150 has a generally cup-like body complementary to the adaptor neck 208. Through its body, the test tool 150 includes a pneumatic core 406. The test tool 150 is configured to make a pneumatic connection with the PFC 200 at the adaptor neck 208. Through the pneumatic core 406, the test tool 150 is operable to add gas to the PFC 200 through the adaptor neck 208. Likewise, the test tool 150 is configured to experience gas pressure in the PFC 200. More specifically, the test tool 150 is operable to add gas in the fuel reservoir 204 and configured to experience gas pressure in the fuel reservoir 204. Relatedly, the sensor system 110 includes a pneumatic sensor operable to detect the gas pressure in the PFC 200. In the operation of the production line 100, for each corresponding PFC 200 and FMD 202, the control module 116 operates the conveyor system 120 to stop the PFC 200 at the test system 124 and operates the test system 124 to conduct a leakproofness test on the PFC 200. More specifically, the control module 116 operates the test arm 152 to axially advance the test tool 150. As the product of axially advancing the test tool 150, the control module 116 operates the test arm 152 to engage the test tool 150 with the PFC 200 at the adaptor neck 208 to make a pneumatic connection therewith. Relatedly, among information about the production line 100, the sensor system 110 is operable to detect the gas pressure in the PFC 200, based on which the control module 116 identifies whether the PFC 200 passed the leakproofness test.

Figure 5:
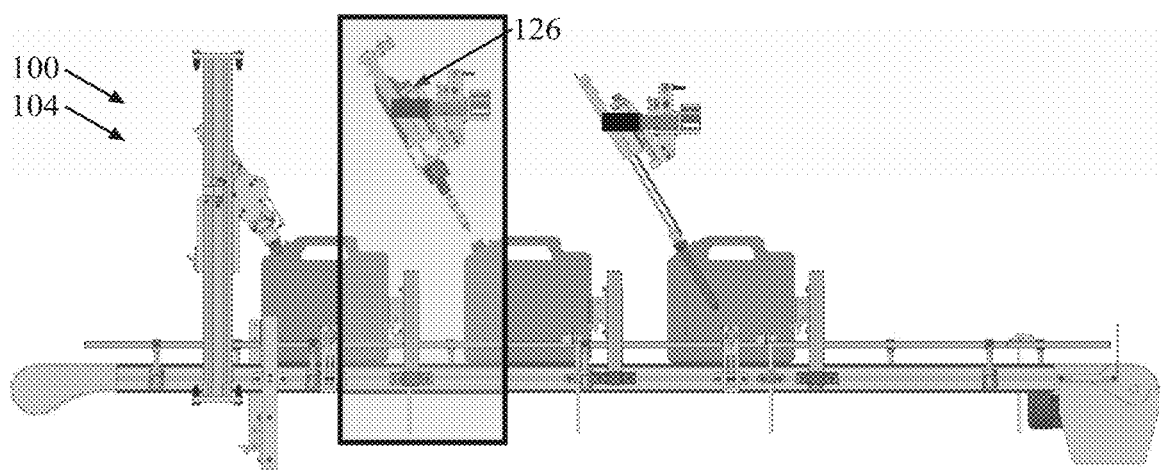
FIG. 5 is a partial perspective view of the installation system, showing aspects of installing FMDs to PFCs on the conveyor system.
Figure 5:
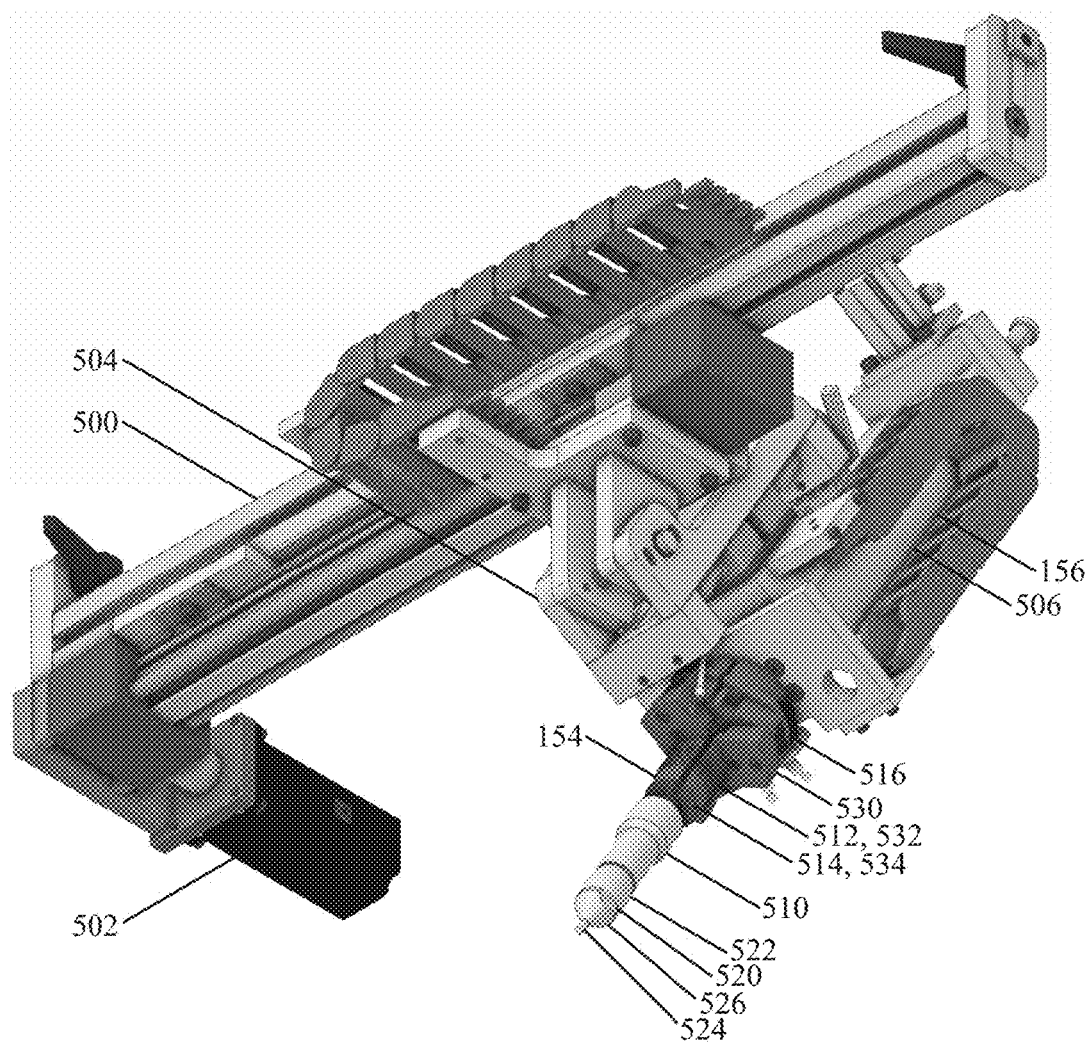

As shown with additional reference to FIG. 5, in the installation system 126, the installation arm 156 includes an installation arm shift slide 500 and an installation arm shift actuator 502, an installation arm pivot bracket 504, and an installation tool actuator 506. The installation arm shift slide 500 is mounted to the frame 106 laterally to the conveyor system 120. The installation arm shift actuator 502 is mounted between the frame 106 and the installation arm shift slide 500. The installation arm pivot bracket 504 is mounted to the installation arm shift slide 500. The installation tool actuator 506 is mounted to the installation arm pivot bracket 504. The installation tool 154 is mounted to the installation tool actuator 506. As part of the installation arm 156, the installation arm pivot bracket 504 supports the installation tool 154 from the frame 106. As supported by the installation arm 156 using the installation arm pivot bracket 504, the installation tool 154 is parallelly oriented with FMDs 202 from the supply system 122 and PFCs 200 on the conveyor system 120. More specifically, the installation tool 154 is parallelly oriented with the first roller stage 310A and the adaptor necks 208 of PFCs 200 on the conveyor system 120. Laterally to the conveyor system 120, by the operation of the installation arm shift actuator 502, the installation arm 156 is operable to shift the installation tool 154 over the supply system 122 and over the conveyor system 120. From over the supply system 122, the installation arm 156 supports the installation tool 154 in axial alignment with FMDs 202 from the supply system 122, and, more specifically, the first roller stage 310A. Similarly, from over the conveyor system 120, the installation arm 156 supports the installation tool 154 in axial alignment with PFCs 200 on the conveyor system 120, and, more specifically, the adaptor necks 208 of PFCs 200 on the conveyor system 120. In addition, by the operation of the installation tool actuator 506, the installation arm 156 is operable to axially advance the installation tool 154 and axially withdraw the installation tool 154.

Figures 2A, 2B, 2C:
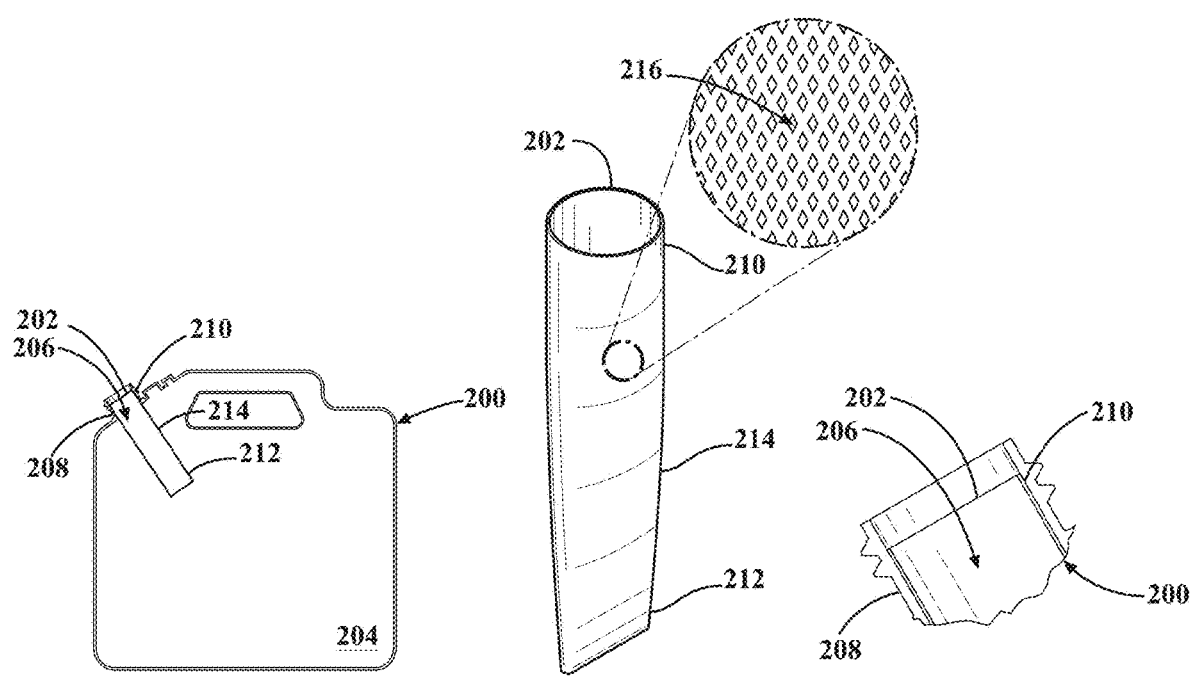
FIG. 2A is a cross-sectional view of a PFC, showing a fuel reservoir and an access port therefor, an adaptor neck around the access port, and an FMD in the fuel reservoir behind the access port.
FIG. 2B is a perspective view of the FMD, showing an open mouth, a closed bottom opposing the mouth, and an intermediate tubular sidewall.
FIG. 2C is a partial cross-sectional view of the PFC across the adaptor neck, showing the FMD being connected by the mouth to the adaptor neck.

As noted above for the PFC 200 and the FMD 202 shown in FIGS. 2A-2C, the FMD 202 is connected by the mouth 210 to the adaptor neck 208. More specifically, from its location coaxially inside the adaptor neck 208, the mouth 210 is permanently connected to the adaptor neck 208 circumferentially therearound. With the PFC 200 and the FMD 202 being made from thermoplastics, the installation tool 154 is operable to install the FMD 202 to the PFC 200 using a hot press thermoplastic fusion process.

As shown, the installation tool 154 includes a mandrel 510, a platen 512, a platen heater 514, and a platen actuator 516. The mandrel 510 has a generally cylindrical cross-sectional shape. Along its length, the mandrel 510 includes a guide tip 520 and a frictional holding structure 522. The mandrel 510 features the guide tip 520 and the frictional holding structure 522 along a forward section, with a rear section forming the remainder of the mandrel 510. The guide tip 520 includes a guide pin 524 and a guide taper 526. The frictional holding structure 522 may be made from one or more high-friction rubbers, such as silicone rubber. The platen 512 extends as a continuation of the mandrel 510. As a continuation of the mandrel 510, the platen 512 has an annular or otherwise generally cylindrical cross-sectional shape. The platen heater 514 is thermally coupled to the platen 512. The platen heater 514 is operable to generate heat. As the product of generating heat, the platen heater 514 is operable to heat the platen 512. The platen 512 is configured to radially expand and radially retract. The platen actuator 516 is connected to the platen 512. The platen actuator 516 is operable to radially expand the platen 512 and radially retract the platen 512. The platen 512 is made from one or more thermally conductive, heat absorptive, heat dissipative, and nonstick materials suitable for thermoplastic fusion processes. For example, the platen 512 may be made from one or more metals, such as stainless steel.

In the illustrated implementation of the installation tool 154, the platen actuator 516 is a parallel gripper-type actuator. As shown, the platen actuator 516 includes multiple jaws 530. The jaws 530 are circumferentially-spaced from one another. The platen actuator 516 is operable to radially outwardly move the jaws 530 and radially inwardly move the jaws 530. In connection with the platen actuator 516, the platen 512 and the platen heater 514 feature multipiece constructions. More specifically, the platen 512 includes multiple platen sectors 532. As parts of the platen 512, the platen sectors 532 have annular sectorial or otherwise generally cylindrical sectorial cross-sectional shapes. The platen sectors 532 are mounted to the jaws 530. As with the jaws 530, the platen sectors 532 are circumferentially-spaced from one another. As the product of radially outwardly moving the jaws 530 and radially inwardly moving the jaws 530, the platen actuator 516 is operable to radially outwardly move the platen sectors 532 and radially inwardly move the platen sectors 532. As the product of radially outwardly moving the platen sectors 532 and radially inwardly moving the platen sectors 532, the platen actuator 516 is operable to radially expand the platen 512 and radially retract the platen 512. The platen heater 514 includes multiple cartridge-type resistance heating elements 534. The heating elements 534 are installed inside the platen sectors 532. The heating elements 534 are operable to generate heat. As the product of generating heat, the heating elements 534 are operable to heat the platen sectors 532. As the product of heating the platen sectors 532, the heating elements 534 are operable to heat the platen 512.

As shown with additional reference to FIGS. 6A-6C, in the operation of the production line 100, for each corresponding PFC 200 and FMD 202, the control module 116 operates the supply system 122 to supply the FMD 202 to the installation system 126 and operates the installation system 126 to receive the FMD 202 from the supply system 122. More specifically, the control module 116 operates the installation arm 156 to shift the installation tool 154 over the supply system 122 and axially advance the installation tool 154. Moreover, the control module 116 operates the first roller stage 310A to feed the FMD 202.

As shown, the installation tool 154 is configured to receive the FMD 202 through the mouth 210. Along the mandrel 510 and the platen 512, the installation tool 154 is complementary to the FMD 202. More specifically, the mandrel 510 is complementary to the sidewall 214. As a continuation of the mandrel 510, the platen 512 is complementary to the mouth 210. Correspondingly, the installation tool 154 is configured to receive the FMD 202 in part around the mandrel 510 and in part around the platen 512. More specifically, the installation tool 154 is configured to receive the sidewall 214 around the mandrel 510 and the mouth 210 around the platen 512. During the handoff of the FMD 202 from the first roller stage 310A to the installation tool 154, the FMD 202 passes around the installation tool 154. Accordingly, the FMD 202 transitions from an exteriorly supported relationship with the first roller stage 310A to an interiorly supported relationship with the installation tool 154. The installation tool 154 meets the FMD 202 through the mouth 210 with the guide tip 520. The guide tip 520 is configured to guide the passage of the FMD 202 around the installation tool 154. More specifically, the guide pin 524 is configured to guide the initial passage of the mouth 210 around the installation tool 154, the absence of which could cause the FMD 202 to glance off the installation tool 154. Moreover, the guide taper 526 is configured to guide the remaining passage of the mouth 210 around the installation tool 154, the absence of which could cause the FMD 202 to snag on the installation tool 154. For example, the guide pin 524 and the guide taper 526 are configured to correct for any combination of nominal axial misalignment between the installation tool 154 and the first roller stage 310A, the FMD 202 elastically flexing under loading by the roller stage 310, the FMD 202 not springing to shape to open the mouth 210, and the like.

As shown with additional reference to FIGS. 7A-7C, in the operation of the production line 100, for each corresponding PFC 200 and FMD 202, the control module 116 operates the conveyor system 120 to stop the PFC 200 at the installation system 126 and operates the installation system 126 to install the FMD 202 to the PFC 200. More specifically, from the over the supply system 122, the control module 116 operates the installation arm 156 to axially withdraw the installation tool 154. The control module 116 then operates the installation arm 156 to shift the installation tool 154 over the conveyor system 120 and axially advance the installation tool 154. As the product of axially advancing the installation tool 154, the control module 116 operates the installation arm 156 to insert the installation tool 154 into the PFC 200 together with the FMD 202. More specifically, the control module 116 operates the installation arm 156 to insert the installation tool 154 into the fuel reservoir 204 through the adaptor neck 208 together with the FMD 202 to the point where the platen 512 is coaxially inside the adaptor neck 208 together with the mouth 210. The control module 116 then operates the platen actuator 516 to radially expand the platen 512. With the radial expansion of the platen 512, the platen 512 radially expands the mouth 210 to assume the same cross-sectional dimensions as the adaptor neck 208. Moreover, the platen 512 radially presses the mouth 210 against the adaptor neck 208. The control module 116 then operates the platen heater 514 to heat the platen 512. With the heating of the platen 512, the platen 512 heats the resulting junction between the mouth 210 and the adaptor neck 208 to locally melt either the mouth 210 or the adaptor neck 208, or both, to fuse the mouth 210 and the adaptor neck 208 together circumferentially around the adaptor neck 208 into a joint upon cooling.

Figure 8:
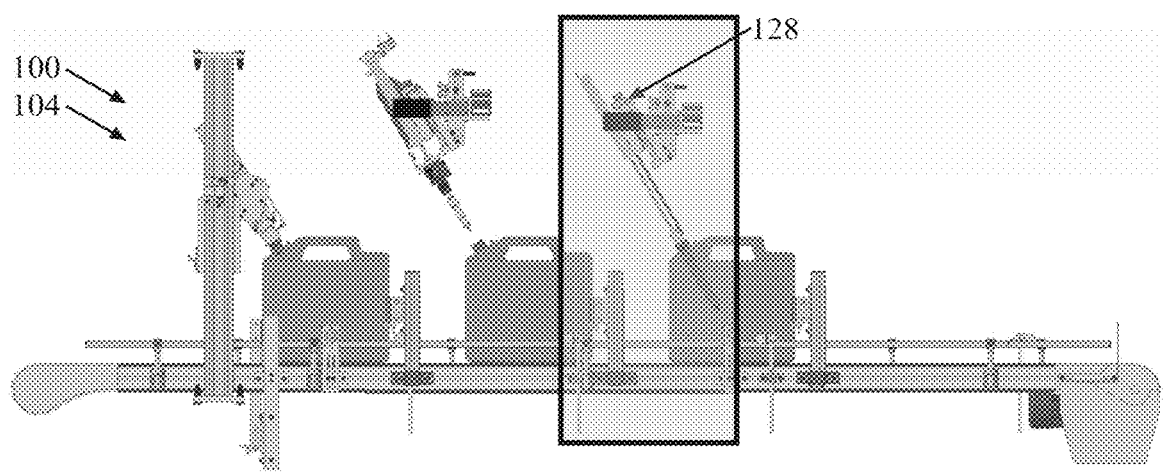
FIG. 8 is a partial perspective view of the check system, showing aspects of conducting FMD checks on PFCs on the conveyor system.
Figure 8:
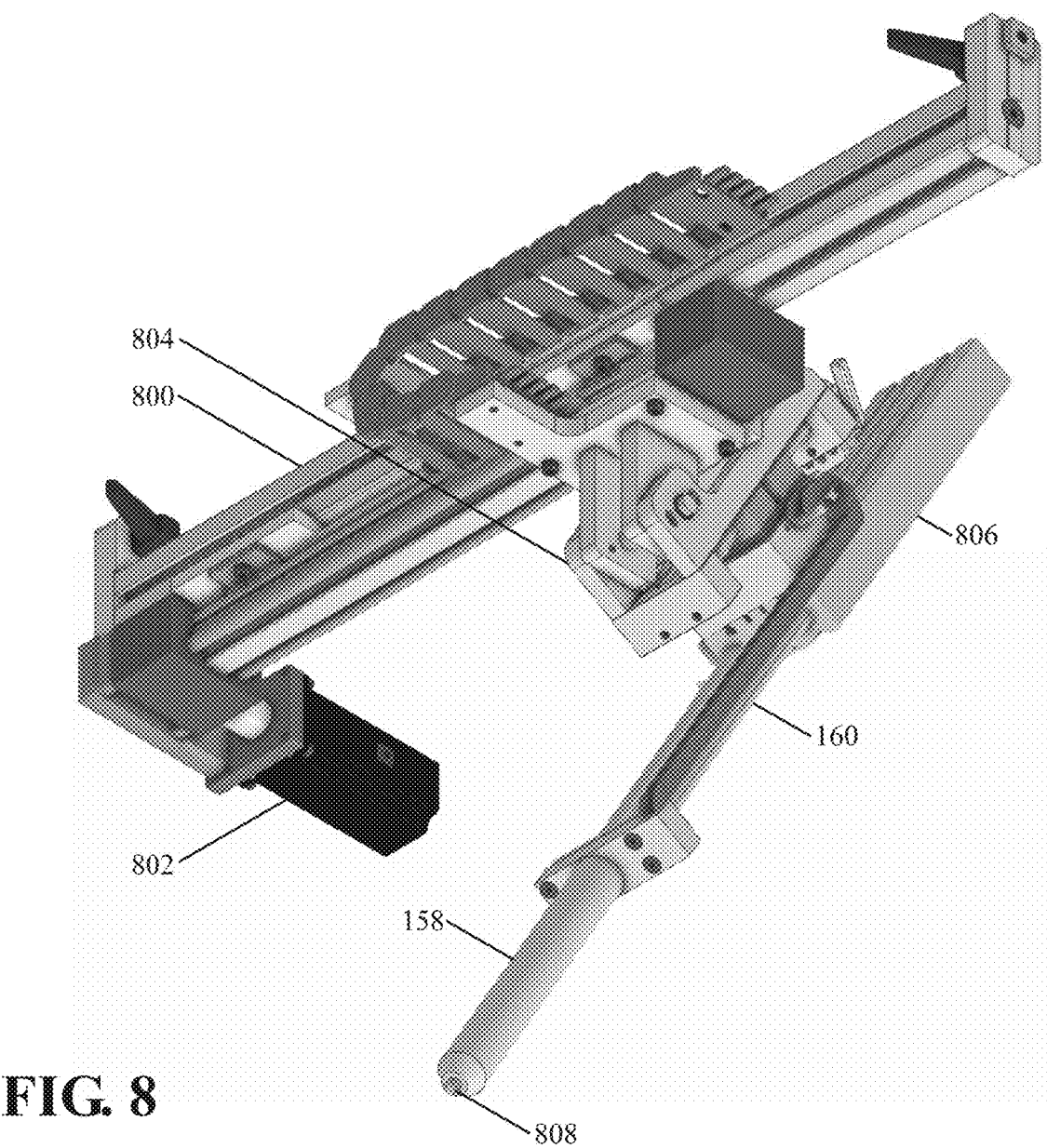

As shown with additional reference to FIG. 8, in the check system 128, the check arm 160 includes a check arm shift slide 800 and a check arm shift actuator 802, a check arm pivot bracket 804, and a check tool actuator 806. The check arm shift slide 800 is mounted to the frame 106 laterally to the conveyor system 120. The check arm shift actuator 802 is mounted between the frame 106 and the check arm shift slide 800. The check arm pivot bracket 804 is mounted to the check arm shift slide 800. The check tool actuator 806 is mounted to the check arm pivot bracket 804. The check tool 158 is mounted to the check tool actuator 806. As part of the check arm 160, the check arm pivot bracket 804 supports the check tool 158 from the frame 106. As supported by the check arm 160 using the check arm pivot bracket 804, the check tool 158 is parallelly oriented with PFCs 200 on the conveyor system 120. More specifically, the check tool 158 is parallelly oriented with the adaptor necks 208 of PFCs 200 on the conveyor system 120. Laterally to the conveyor system 120, by the operation of the check arm shift actuator 802, the check arm 160 is operable to shift the check tool 158 away from the conveyor system 120 and over the conveyor system 120. From away from the conveyor system 120, the check arm 160 supports the check tool 158 in a clearance position for PFCs 200 on the conveyor system 120. From over the conveyor system 120, the check arm 160 supports the check tool 158 in axial alignment with PFCs 200 on the conveyor system 120, and, more specifically, the adaptor necks 208 of PFCs 200 on the conveyor system 120. In addition, by the operation of the check tool actuator 806, the check arm 160 is operable to axially advance the check tool 158 and axially withdraw the check tool 158.

As shown, the check tool 158 has a generally cylindrical cross-sectional shape. Along its length, the check tool 158 is complementary to the FMD 202. At its end, the check tool 158 includes an FMD sensor 808. As part of the sensor system 110, the FMD sensor 808 is operable to detect FMDs 202 around the check tool 158. In the operation of the production line 100, for each corresponding PFC 200 and FMD 202, the control module 116 operates the conveyor system 120 to stop the PFC 200 at the check system 128 and operates the check system 128 to conduct an FMD check on the PFC 200. More specifically, the control module 116 operates the check arm 160 to shift the check tool 158 and over the conveyor system 120 and axially advance the check tool 158. As the product of axially advancing the check tool 158, the control module 116 operates the check arm 160 to insert the check tool 158 into the PFC 200 and inside the FMD 202. More specifically, the control module 116 operates the check arm 160 to insert the check tool 158 into the fuel reservoir 204 through the adaptor neck 208 and inside the FMD 202. Relatedly, among information about the production line 100, the sensor system 110 is operable to detect the FMD 202 around the check tool 158, based on which the control module 116 identifies whether the PFC 200 passed the FMD check.

With reference once again to FIG. 1A, as noted above, the processors 112, the memory 114, and the control module 116 together serve as a computing device whose control module 116 is configured to coordinate the operation of the production line 100. Although the production line 100, as shown, includes one control module 116, it will be understood that this disclosure is applicable in principle to otherwise similar production lines 100 that include multiple control modules 116.

The processors 112 may be any components configured to execute any of the processes described herein or any form of instructions to carry out such processes or cause such processes to be performed. The processors 112 may be implemented with one or more general-purpose or special-purpose processors. Examples of suitable processors 112 include microprocessors, microcontrollers, digital signal processors, or other forms of circuitry that execute software. Other examples of suitable processors 112 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry, or controllers. The processors 112 may include at least one hardware circuit (e.g., an integrated circuit) configured to carry out instructions contained in program code. In arrangements where there are multiple processors 112, the processors 112 may work independently from each other or in combination with one another.

The memory 114 is a non-transitory computer readable medium. The memory 114 may include volatile memory, nonvolatile memory, or both. Examples of suitable memory 114 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination of these. The memory 114 includes stored instructions in program code. Such instructions are executable by the processors 112 or the control module 116. The memory 114 may be part of the processors 112 or the control module 116, or may be communicatively connected the processors 112 or the control module 116.

In general, the control module 116 includes instructions that may be executed by the processors 112. The control module 116 may be implemented as computer readable program code that, when executed by the processors 112, execute one or more of the processes described herein. Such computer readable program code may be stored on the memory 114. The control module 116 may be part of the processors 112, or may be communicatively connected the processors 112.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A production line for PFCs with FMDs, comprising:
   a conveyor system, the conveyor system operable to convey the PFCs;
   a supply system, the supply system including a roller stage, the roller stage operable to feed the FMDs; and
   an installation system, the installation system including an installation tool, the installation tool including a mandrel, a platen, a platen heater, and a platen actuator, the installation tool configured to receive the FMDs from the roller stage in part around the mandrel and in part around the platen, configured to insert into the PFCs on the conveyor system, and operable to install the FMDs thereto by the operation of the platen heater to heat the platen and the platen actuator to radially expand the platen.

2. The production line of claim 1, wherein the supply system is operable to make the FMDs, and the roller stage is operable to feed FMDs made by the supply system.

3. The production line of claim 1, wherein the supply system is operable to make FMDs having woven constructions, and the roller stage is operable to feed FMDs having woven constructions made by the supply system.

4. The production line of claim 1, wherein:
   the roller stage includes adjacent twin-rollers, the adjacent twin-rollers having lines of centers defining an axial orientation of the roller stage; and
   the installation system includes an installation arm, the installation tool mounted to the installation arm, and the installation arm operable to move the installation tool over the supply system in axial alignment with the roller stage to receive the FMDs therefrom.

5. The production line of claim 1, wherein:
   the supply system is operable to make FMDs having woven constructions;
   the roller stage includes adjacent twin-rollers, the adjacent twin-rollers having lines of centers defining an axial orientation of the roller stage; and
   the installation system includes an installation arm, the installation tool mounted to the installation arm, and the installation arm operable to move the installation tool over the supply system in axial alignment with the roller stage to receive FMDs having woven constructions therefrom.

6. The production line of claim 1, wherein the installation system includes an installation arm, the installation tool mounted to the installation arm, and the installation arm operable to move the installation tool over the supply system to receive the FMDs from the roller stage.

7. The production line of claim 1, wherein the installation system includes an installation arm, the installation tool mounted to the installation arm, and the installation arm operable to insert the installation tool into the PFCs on the conveyor system.

8. The production line of claim 1, wherein the installation system includes an installation arm, the installation tool mounted to the installation arm, and the installation arm operable to move the installation tool over the supply system to receive the FMDs from the roller stage, over the conveyor system, and from over the conveyor system, into the PFCs thereon.

9. The production line of claim 1, further comprising:
   a test system upstream of the installation system, the test system operable to conduct leakproofness tests on the PFCs on the conveyor system.

10. The production line of claim 1, further comprising:
    a check system downstream of the installation system, the check system operable to conduct FMD checks on the PFCs on the conveyor system.

11. A production line for PFCs with FMDs, comprising:
    a conveyor system, the conveyor system operable to convey the PFCs;
    a supply system, the supply system operable to make the FMDs;
    an installation system, the installation system including an installation tool, the installation tool including a mandrel, a platen, a platen heater, and a platen actuator, the installation tool configured to receive the FMDs from the supply system in part around the mandrel and in part around the platen, configured to insert into the PFCs on the conveyor system, and operable to install the FMDs thereto by the operation of the platen heater to heat the platen and the platen actuator to radially expand the platen;
    a test system upstream of the installation system, the test system operable to conduct leakproofness tests on the PFCs on the conveyor system; and
    a check system downstream of the installation system, the check system operable to conduct FMD checks on the PFCs on the conveyor system.

12. The production line of claim 11, wherein the supply system is operable to make FMDs having woven constructions, and the installation tool configured to receive the FMDs having woven constructions from the supply system.

13. The production line of claim 11, wherein:
    the supply system includes a roller stage, the roller stage operable to feed the FMDs; and
    the installation tool is configured to receive the FMDs from the roller stage.

14. The production line of claim 11, wherein the installation system includes an installation arm, the installation tool mounted to the installation arm, and the installation arm operable to move the installation tool over the supply system to receive the FMDs therefrom.

15. The production line of claim 11, wherein the installation system includes an installation arm, the installation tool mounted to the installation arm, and the installation arm operable to insert the installation tool into the PFCs on the conveyor system.

* * * * *